May 6, 1958  H. H. VICKERS  2,833,750
METHOD FOR FINISHING POLYMERS
Filed June 17, 1953  2 Sheets-Sheet 1

Herbert H. Vickers  Inventor
By W. H. Smyers  Attorney

Herbert H. Vickers — Inventor

United States Patent Office 2,833,750
Patented May 6, 1958

2,833,750

METHOD FOR FINISHING POLYMERS

Herbert H. Vickers, Union, N. J., assignor to Esso Research and Engineering Company, a corporation of Delaware Application June 17, 1953, Serial No. 362,365

13 Claims. (Cl. 260—85.3)

This invention relates to polymerization processes and apparatus and particularly to processes and apparatus for the low temperature polymerization of isoolefins or mixtures of isoolefins and other copolymerizable compounds.

It has been known for some time that high molecular weight polymers, i. e., having a molecular weight of about from 15,000–25,000 up to 300,000 or more (as determined by the Staudinger method) are obtained if isoolefins, such as isobutylene, are contacted with a Friedel-Crafts type catalyst such as aluminum chloride and the like at temperatures below +14° F. (see, for example, Mueller-Cunradi, U. S. Patent No. 2,203,873, issued June 11, 1940). More recently it was found that a copolymer which is curable with sulfur is obtained if a mixture of about 70 to 99.5 weight percent of an isoolefin such as isobutylene with about 30 to 0.5 weight percent of a conjugated diolefin having 4 to 5 carbon atoms such as butadiene or isoprene is treated with a solution of a Friedel-Crafts type catalyst such as aluminum chloride in a non-complex forming low freezing solvent such as methyl or ethyl chloride and at temperatures of between +14° F., and −256° F., preferably between −40° F., and −153° F. (see, for example, Australian Patent No. 112,875, issued July 31, 1941). Similarly resins suitable as self-supporting films, etc. are prepared by contacting isobutylene and styrene e. g. in the proportion of 20–80% styrene and 80–20% isobutylene, at temperatures below −50° C. The polymerizations have been conducted in the presence of either an internal refrigerant such as liquefied ethylene, in which case the heat of reaction is removed directly by evaporation of part of the ethylene without the necessity for transferring heat through the surfaces of reaction vessels or through cooling coils arranged in the reaction vessels, or in the presence of an external refrigerant whereby the heat of reaction is removed by heat exchange through the walls of the reaction vessels. Consequently, the reaction is now carried out in such a manner as to keep the solid polymer particles in a finely divided condition suspended in the cold reaction mixture so that a slurry of solid polymer particles in the cold reaction mixture is obtained which can be handled at low temperature. In view of the inflammable nature of certain of the reactants the slurry is discharged into a well-agitated body of a liquid flashing medium, such as water, in which the polymer is suitably insoluble and which is maintained at a temperature well above the boiling point of the majority of the volatile materials accompanying the polymer to form a slurry of finely divided polymer particles in the warm flashing liquid. This slurry is then stripped of any residual volatile materials, the polymer is separated from the main body of the liquid, as for example, by decantation or filtration, and is dried while being carried through a tunnel on a screen or on sections of a perforated plate in the presence of warm air. These processing steps are preferably arranged so that the successive operations are carried out in a continuous manner.

However, difficulty has been encountered in obtaining a suitably dry polymer in this manner. The bed of polymer particles on the dryer conveyor belt tends to flow sufficiently to form an impermeable mat at the usual dryer temperatures of 225–325° F. before the desired dryness is reached, particularly when low molecular weight polymers are being processed. When this occurs the air flow through the dryer is hindered to such an extent that satisfactory dryness of the polymer is difficult to procure during normal residence period in the dryer. In addition the mat acts as a filter and picks up foreign particles from the air. Such particles cause serious faults or holes in any film subsequently made from the polymer. If, on the other hand, an attempt is made to prevent such matting of the polymer the temperature must be lowered, or the residence time shortened, to a point resulting usually in the incomplete drying within the tunnel dryer. In any case, the moisture content, porosity, and low temperature of the polymer discharging from the dryer interfere with the proper operation of the subsequent milling step which is usually employed to deliver the polymer in a suitable condition of dryness and compactness for packaging and sale. For commercial use it is usually required that polymers of this type be dried to a moisture content below 0.5%, and it is preferable to reduce this to 0.1 or 0.2%, or even lower.

In the Wurth and Lane patent U. S. 2,472,037, issued May 31, 1949, an attempt was made to solve the above difficulties by the employment of a series of standard screw machines to subject the polymer to a simultaneous dewatering, compacting, and extruding action at an elevated temperature. However, the use of these machines has not proven satisfactory in actual operation when a large amount of water is present and/or when handling a large volume of polymer. The machines described by Wurth and Lane will either pass a large amount of product through wet or a small amount through dry.

It is, therefore, the principal object of this invention to provide a method of drying polymers which will permit more complete removal of water from the polymer and more efficient operation of any subsequent milling step.

It is a further object of this invention to provide means for compacting, dewatering and degassing the polymer with a minimum of air contact in order to prevent its contamination with foreign particles.

A still further object of this invention is to provide means for obtaining a more streamlined, smaller, cleaner and cheaper drying operation than that possible with the usual tunnel driers and their attendant equipment.

These and other objects of this invention are accomplished by continuously subjecting the wet polymer after separating it from the main body of the water to the action of a series of specially designed screw extruders. The first of these extruders is a short-barreled compacting extruder having a large feed opening and a tapered screw. The second extruder is a dewatering and degassing extruder. This machine is divided into two zones, the first portion being particularly designed to dewater and is provided with a rifled barrel. The second portion is provided with a larger screw than the first portion and is separated from the first portion by means of a valve and vent arrangement which permits a controlled pressure build-up in the first zone to effectively screen out the remaining loose water. The third extruder in the series is similar to the second except that it does not have a rifled barrel and no drain holes and is designed to increase the polymer temperature to 400° F., and completely dry the product.

The accompanying drawings illustrate preferred methods for practicing the process of this invention.

Figure 1:
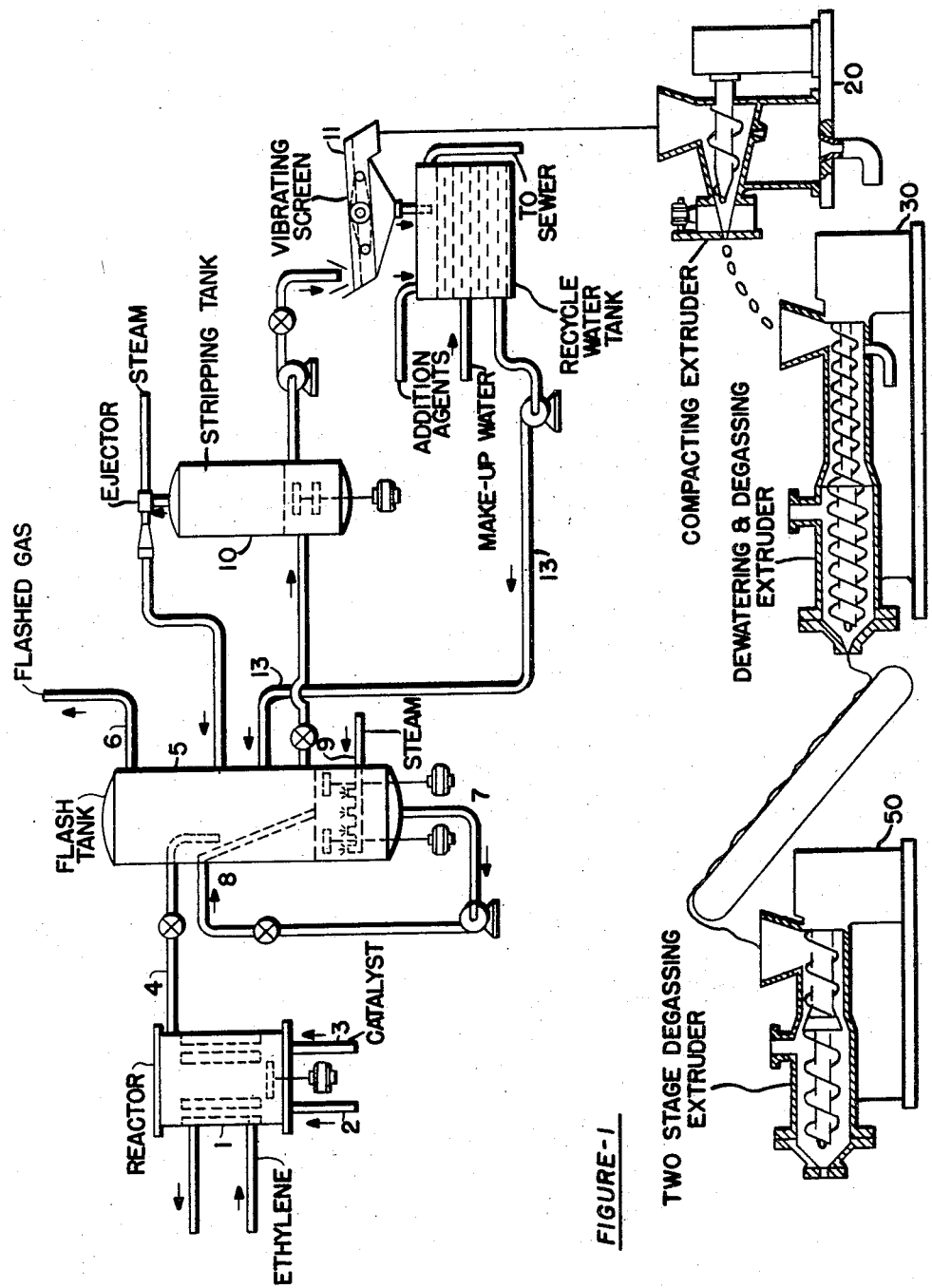
Figure 1 is a diagrammatic representation of a complete unit embodying the principles of this disclosure.

Referring therefore, to the drawing, there is shown a reactor 1, wherein isoolefinic materials and preferably mixtures of isoolefinic and diolefinic materials (e. g. isoprene or styrene) alone or together with a diluent supplied through feed inlet 2 are reacted at low temperatures, preferably around —140° F., by the addition of a Friedel-Crafts catalyst supplied through line 3. The polymer forms as a slurry of fine solid polymer particles suspended in cold reaction medium comprising unreacted hydrocarbons, diluents, catalyst and catalyst solvent as well as impurities is withdrawn from the reactor through line 4, and is discharged into flash tank 5, containing a liquid, such as water, inert to the polymer and maintained at a temperature of about 150° F., wherein the volatile materials associated with the polymer are flashed into vapor. The flashed gases are withdrawn from the flash tank through line 6 and are passed to suitable purification and recovery means for reconditioning the flashed materials for reuse in the process.

The water or other liquid flashing medium is heated as by the introduction of steam thereinto and vigorously agitated by means of suitable stirrers or the like to keep the polymer suspended as a uniform slurry in the flashing liquid. Flashing medium may also be withdrawn from the flash tank through line 7 and pumped back into the flash tank as at 8 in such a manner as to impinge against the polymer streams entering the flash tank thereby breaking it up in order to prevent agglomeration of the polymer into relatively large masses which might plug the water slurry system and which might contain excessive amounts of trapped volatile liquid.

The polymer is withdrawn from the flash tank through line 9 as a slurry of finely divided solid particles suspended in the warm flashing liquid and is discharged into the stripping tank 10. The treatment of the polymer as a slurry in the warm fluid, if necessary with injection of stripping vapors such as steam, is carried out to such a degree that nearly all the highly volatile materials originally absorbed in or absorbed on the polymer and dissolved in the liquid are removed. A preferred type of operation is one in which the volatiles are removed in two zones, the first as in flash tank 5 at atmospheric or slightly above atmospheric pressure and the other as in stripping tank 10 at below atmospheric pressure. Preferably, the water in the stripper 10 is boiling, due to the use of vacuum. The flow of water is usually so large that steam does not have to be added to the stripper when the water enters hot enough.

The slurry of finely divided polymer in warm flashing liquid, desirably water, is passed from the stripping tank 10 to a decantation or filtration means such as, for example, a vibrating screen wherein it is separated from the greater part of the suspending liquid. The separated polymer which may carry with it up to 2 or 3 pounds, or even more, of water per pound of dry polymer may be discharged into a series of dewatering and degassing extruders where the water is progressively squeezed out and finally heated under pressure and flashed off.

The first piece of equipment in this series is a tapered screw compacting extruder 20. Its prime purpose is to compact the wet crumb, squeeze out most of the water, to less than 10%, and heat the polymer slightly to 100–200° F. This tapered screw extruder, because of its shape, lends itself to drainage and is very effective in squeezing out a large percentage of water. The tapered design is also of help in feeding the loose crumb, since the large end of the tapered screw is directly under the feed hopper and therefore has a feed capacity equal to the large end of the screw.

The tapered screw extruder, 20, is followed by a single screw dewatering and degassing extruder 30 which squeezes the water content down to less than 5% in the first zone, adding heat until the polymer temperature is raised past the boiling point of water. At this stage the extruder pressure is relieved by an increase in barrel diameter, and the vapors are flashed off through a vent. From the vent to the discharge, the extruder is of normal design and rebuilds the pressure and temperature to extrude the polymer through the outlet die at 250–300° F., while at the same time flashing off additional vapor and reducing the water content to less than 2%.

The final treatment is in a single screw degassing extruder 50 which also has one or more degassing vents in its middle section. This final extruder builds the polymer temperature up to 300–450° F., flashing off any remaining vapor, and extrudes a dry polymer in a form for subsequent handling.

Figure 2:
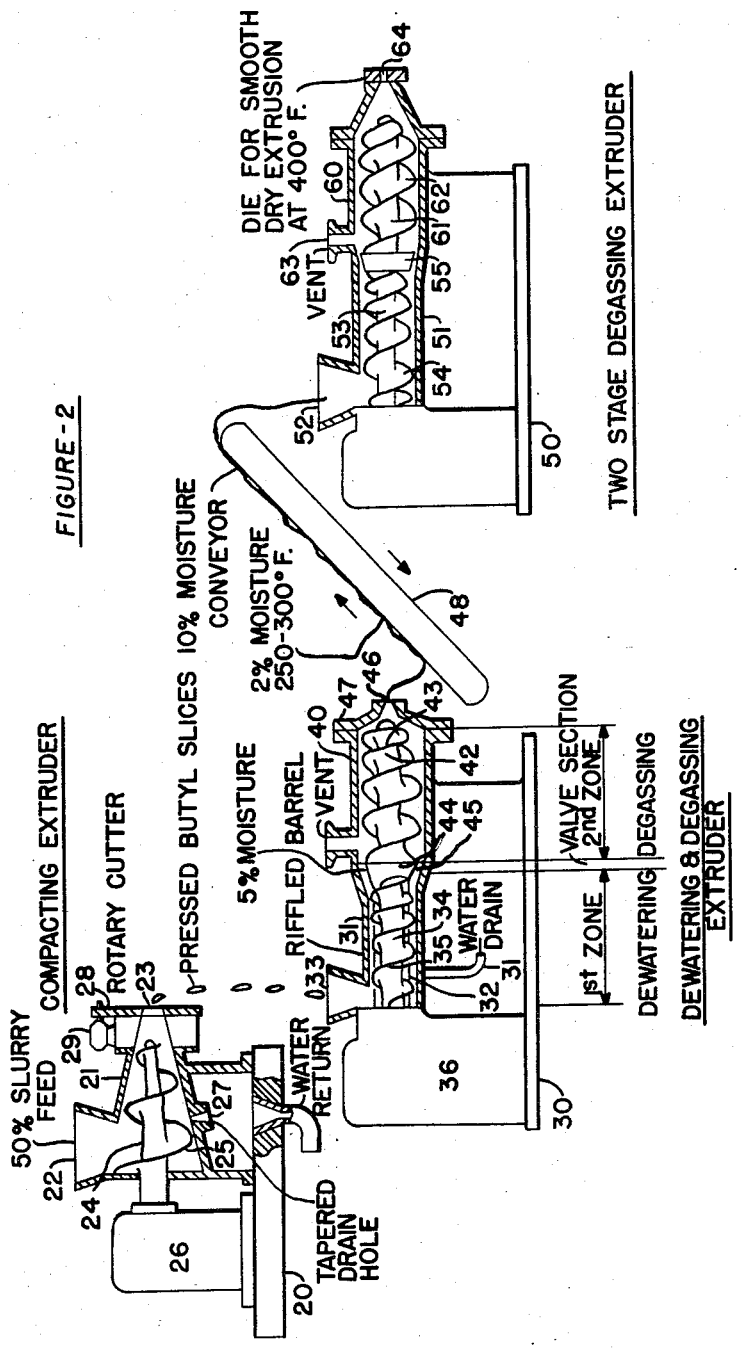
Figure 2 is a detailed view in cross-section of the extruders of Figure 1.

Referring now to Figure 2, extruder 20 consists of a tapered body portion 21 having a feed opening 22 in the enlarged end and an extrusion nozzle 23 in the narrow end. The body is fitted with tapered screw 24 having flights 25 and operated by prime mover 26. The flights are so arranged that polymer introduced through opening 22 is forced toward the extrusion nozzle 23 near the discharged end of the feed section 22. The underside of tapered body portion 21 is provided with tapered drain hole 27. The particular location of this drain hole permits a slight compacting of the loose polymer to take place before it is passed across the drain opening. A rotary cutter 28 operated by motor 29 is arranged adjacent the nozzle 23, so as to cut extruded polymer into slices.

Extruder 30 consists of a dewatering section 31 and a larger degassing section 40. Section 31 is provided with rifled barrel 31, feed opening 33 and screw 34 having flights 35 and operated by prime mover 36. A water drain 37 is provided in the forward end of the section 31.

The degassing section 40 is provided with vent opening 41 and screw 42 having flights 43. Screw 42 is a continuation of screw 33 but is made with slightly larger flights than screw 33 to substantially fill the increased space in the larger section 40. Flights 43 are separated from flights 34 by valve 44 which is a thickened section substantially filling the space between the two flights 34 and 43 except for a narrow clearance 45 between the block and the walls of the extruder. An extrusion nozzle 46 is attached to the exit end of degassing section by means of clamps 47.

A conveyor 48 is provided to convey extruded polymer from extruder 30 to extruder 50. Extruder 50 is a two-stage degassing extruder and consists of sections 51 and 60. Section 51 is provided with feed opening 52, screw 53 having flights 54 and valve 55. Section 60 is provided with screw 61, being a continuation of screw 53. Screw 61 is provided with flights 62, vent 63 and extrusion nozzle 64.

The combination of the three extruders described above enables a very wet polymer to be completely dried without the use of tunnel driers and similar equipment. The compacting extruder is of particular importance in the combination. The tapered design and the location of the tapered drain hole make it possible to remove the bulk of the water from a polymer water slurry containing any amount of water. The location of the drain hole slightly forward of the feed hopper allows the polymer crumb to be agglomerated before it reaches the hole. Any few particles that do pass into this drain hole do not obstruct the opening due to its tapered construction and are carried back into the system with the recycled water.

Actual operation with this extruder has indicated that it will handle any amount of water in a polymer-water slurry, yielding a compact extruded polymer which can be fed into any type of dewatering and degassing extruder such as that described in the Wurth patent or preferably those described above.

The advantages of the invention will be better understood from a consideration of the following experimental data which are given for the sake of illustration, but without intention of limiting the invention thereto:

Wet polymer crumb prepared from isoprene and 2.5% isobutylene in accordance with the method described above, +32% moisture, was fed to a 2" twin screw extruder of the type disclosed in the Wurth patent, under varying conditions of temperature and R. P. M. with the following results:

| R. P. M. | Mean Extruder Temp., °F. | Thruput, #/Hr. | Moisture Content and Remarks |
|---|---|---|---|
| 124 | 410 | 158 | Wet and unsatisfactory. |
| 110 | 482 | 193 | .14%. Could not hold the high temp. to maintain these conditions. |
| 137 | 464 | 210 | .32%. Increased R. P. M. resulted in slight increase in capacity, but also increase in final moisture content. |
| 62 | 455 | 105 | .19%. Dry extrusion, but too low a capacity. |

The above data show that free water in the feed hopper is a serious handicap when employing an extruder of the type disclosed in the Wurth patent. The best conditions were obtained with a starved feed which resulted in a lower water level in the feed hopper and less water to be evaporated in the extruder barrel. On the other hand the extruder of the present invention under the same conditions handles crumb containing any amount of water. Large quantities of water can be pumped into the feed hopper and be accommodated by the extruder without any effect on the extrusion rate or quality of the polymer.

The nature and objects of the present invention having been thus described and illustrated, what is claimed as new and useful and is desired to be secured by Letters Patent is:

1. In a process for finishing particles of solid polymers containing occluded liquids, the improvement which comprises pressing out sufficient liquid that the polymer particles are compacted, subdividing the compacted agglomerate formed, pressing out sufficient liquid from the resulting subdivided material that the liquid content is less than about 5% based on polymer, and raising the temperature to a level between about 250° and 450° F. until substantially all of the remaining liquid is volatilized.

2. Process according to claim 1 in which the polymer is a polyisoolefin.

3. Process according to claim 1 in which the polymer is a copolymer of an isoolefin and a multi-olefin.

4. Process according to claim 1 in which the polymer is a copolymer of an isoolefin and a vinyl aromatic compound.

5. In a process for finishing solid, high molecular weight polymers prepared by low temperature polymerization of a feed comprising an isoolefin in the presence of a Friedel-Crafts catalyst in which the cold polymer and associated low boiling materials including unreacted monomers and diluents are discharged into a heated liquid medium in which the polymer is insoluble in order to volatilize said associated low boiling materials whereby to form a slurry of polymer particles in the liquid, the improvement which comprises passing the resulting polymer slurry directly to a compacting means tapered into the direction of compaction and having an inlet portion for feed and a discharge portion for product, said compacting means defining a drain aperture located near the discharge portion thereof, said drain aperture being tapered from inside outwardly to prevent plugging, passing the polymer through said compacting means, and subdividing the resulting compacted agglomerate formed.

6. In a process for finishing a solid high molecular weight rubbery polymer prepared by Friedel-Crafts catalytic low temperature polymerization in which the cold polymer and lower boiling unreacted monomers and diluents are discharged into a liquid medium heated to a temperature sufficient to flash off substantially all of said lower boiling materials whereby to form a slurry of polymer particles in the liquid, the improvement which comprises passing the resulting polymer slurry through an extrusion zone tapered in the direction of extrusion and maintained at a temperature between about 100° and 200° F., cutting the extruded polymer formed into segments, passing said polymer segments through a two-stage deliquefying and degassing screw extrusion zone, the deliquefying portion being maintained at a temperature above about 212° F. and reducing the liquid content of the polymer to less than about 5%, the degassing portion being maintained at a temperature between about 250° and 300° F. and reducing the liquid content of the polymer to less than about 2%, and then substantially completely drying the polymer at a temperature between about 300° and 450° F.

7. In a process for finishing solid, high molecular weight rubbery polymers prepared from a feed comprising at least one isoolefin at low temperatures in the presence of a Friedel-Crafts catalyst, in which process the cold polymer product and associated low boiling materials including unreacted monomers and diluents are discharged into hot water in which the polymer is insoluble in order to flash off said associated low boiling materials whereby to form a slurry of polymer particles in water, the improvement which comprises separating wet polymer particles from the water, subjecting the separated wet polymer particles to screw extrusion through an extrusion zone tapered into the direction of extrusion and maintained at a temperature between about 100° and 200° F. whereby the polymer is freed of about 90% of residual water and compacted, successively cutting the extruded polymer formed into segments, passing said polymer segments through a two-stage extrusion zone maintained in the first stage at a temperature above about 212° F. whereby the polymer is dewatered so as to contain less than about 5% water, said second stage being maintained at a temperature between about 250° and 300° F. whereby the polymer is degassed of about an additional 3% water, and then passing the polymer through an extrusion zone maintained at a temperature between about 300° and 450° F. whereby the polymer is essentially freed of substantially all residual water and is further degassed and compacted.

8. Process according to claim 7 in which the iso-olefin is isobutylene.

9. Process according to claim 7 in which the isobutylene is copolymerized with 30 to 0.5 wt. percent of a conjugated diolefin having 4 to 5 carbon atoms.

10. Process according to claim 9 in which the diolefin is isoprene.

11. Process according to claim 7 in which the isobutylene is copolymerized with 20 to 80 wt. percent of styrene.

12. In an apparatus for treating solids and liquids, the combination which comprises a conical shaped compacting screw extruder tapered in the direction of compaction, said extruder having a large inlet portion and a small discharge portion, the lower surface of said extruder defining a drain aperture for liquid located near the discharge portion of said extruder, said drain aperture being tapered from the inside outwardly to prevent plugging, means for introducing a solid material into the inlet portion of said extruder, and a cutting means cooperable with said discharge portion, said cutting means being adapted to successively cut the extruded solid formed into segments.

13. In an apparatus for finishing polymers containing vaporizable liquids, the combination which comprises a hollow two-stage dewatering and degassing screw extruder, having an inlet portion and a discharge portion, said extruder comprising a cylindrical housing member divided into a first and a second section, a rotatable tapered screw member extending into each of said sections, the first section being of smaller diameter than the second section and defining a lower drain aperture adapted to discharge liquid therefrom, the second section communicating with the first section and being a degassing section defining a vent for removing vapors formed, said vent being located in an upper portion of said second section.

References Cited in the file of this patent

UNITED STATES PATENTS

| | | |
|---|---|---|
| 2,542,459 | Bannon | Feb. 20, 1951 |
| 2,542,559 | Nelson et al. | Feb. 20, 1951 |
| 2,611,751 | Scott | Sept. 23, 1952 |